United States Patent [19]
Hedrei et al.

[11] Patent Number: 6,072,283
[45] Date of Patent: Jun. 6, 2000

[54] MICRO-CONTROLLER-OPERATED HIGH INTENSITY DISCHARGE LAMP BALLAST SYSTEM AND METHOD

[75] Inventors: George C. Hedrei, Mount Royal; Nicolas St-Germain, Montreal, both of Canada

[73] Assignee: Transformateurs Transfab Inc., Boucherville, Canada

[21] Appl. No.: 08/805,116

[22] Filed: Feb. 24, 1997

[51] Int. Cl.[7] ........................................................ G05F 1/00
[52] U.S. Cl. .......................... 315/307; 315/308; 315/291; 315/209 R; 315/DIG. 7
[58] Field of Search ........................................ 315/307, 308, 315/209 R, 291, 244, DIG. 4, DIG. 5, DIG. 7, 360, 362

[56] References Cited

U.S. PATENT DOCUMENTS

| | | | |
|---|---|---|---|
| 4,614,898 | 9/1986 | Itani | 315/224 |
| 4,677,346 | 6/1987 | Roberts et al. | 315/226 |
| 4,816,721 | 3/1989 | Ganser | 315/241 |
| 5,204,587 | 4/1993 | Mortimer et al. | 315/308 |
| 5,381,076 | 1/1995 | Nerone | 315/209 |
| 5,416,387 | 5/1995 | Cuk et al. | 315/209 R |
| 5,426,346 | 6/1995 | Allison | 315/209 |
| 5,463,284 | 10/1995 | Mattas | 315/240 |
| 5,623,187 | 4/1997 | Caldeira et al. | 315/307 |
| 5,666,029 | 9/1997 | McDonald | 315/86 |

*Primary Examiner*—Haissa Philogene
*Attorney, Agent, or Firm*—Darby & Darby

[57] ABSTRACT

The present invention is related to a micro-controller-operated high intensity discharge lamp ballast system. This system comprises the following elements: a boost pre-regulator means to convert a DC voltage into a high voltage DC bus to facilitate proper lamp power regulation, an inverter means to convert the high voltage DC bus into a high frequency FM modulated square wave voltage, a lamp matching network and filter means to convert the high frequency FM modulated square wave voltage into a high frequency FM modulated current facilitating the proper lamp power regulation, a lamp current and voltage sensing means to sense a lamp voltage and a lamp current across the high intensity discharge lamp and to feed the lamp voltage and lamp current into a micro-controller means adapted to facilitate proper functioning of the high intensity discharge lamp ballast system by means of sending a predetermined set of commands provided to monitor and control all elements of this system. The micro-controller means is adapted to control the lamp power by means of sending control signals to the boost pre-regulator means adapted to adjust the high voltage DC bus. The micro-controller means is also adapted to send drive signals to the inverter means to generate a high frequency FM modulated gating and shaping of the inverter means provided to obtain a stable operation of the high intensity discharge lamp at high frequencies and to eliminate acoustical resonance.

17 Claims, 10 Drawing Sheets

MICRO-CONTROLLER-OPERATED HIGH INTENSITY DISCHARGE LAMP BALLAST SYSTEM AND METHOD

The present invention is related to high intensity discharge lamp electronic ballast, and more particularly to a micro-controller-operated high intensity discharge lamp ballast system and method.

There is known U.S. Pat. No. 5,381,076 related to a metal halide electronic ballast comprising a power supply, metal halide lamp, inverter, resonant circuit, coupling capacitor, and a controller responsive to at least a predetermined set point control voltage and to output voltage of the resonant circuit.

There are also known electronic ballasts for metal halide lamps described by Faehnrich and Rash in the "Journal of the Illuminating Engineering Society, Summer 1988" referring to various possibilities for operating metal halide lamps, and in particular going into details for designing a ballast for double-ended HQI lamps with hot restrike characteristics. One of such samples shows a typical block-diagram of electronic ballast for metal halide lamps with square wave lamp current comprising two invertors, limiting the lamp current and control circuitry.

Behaviour of metal halide lamps with conventional and electronic ballasts have been described by Rash and Statnic in the "Journal of the Illuminating Engineering Society, Summer 1991", and is related to realization of a regulated electronic ballast for the metal halide lamp in a resonance-free frequency gap below the fundamental resonances, at frequencies that are easily generated.

SUMMARY OF THE INVENTION

Broadly, the present invention relates to a micro-controller-operated high intensity discharge lamp ballast system comprising:

a boost pre-regulator means adapted to convert a DC voltage into a high voltage DC bus to facilitate a proper lamp power regulation;

an inverter means adapted to convert said high voltage DC bus into a high frequency FM modulated square wave voltage provided to feed a lamp matching network and filter means adapted to convert said high frequency FM modulated square wave voltage into a high frequency FM modulated current facilitating the proper lamp power regulation;

a lamp current and voltage sensing means adapted to sense a lamp voltage and a lamp current across said high intensity discharge lamp and to feed said lamp voltage and lamp current into a micro-controller means adapted to facilitate proper functioning of said high intensity discharge lamp ballast system by means of sending a predetermined set of commands provided to monitor and control all elements of said system.

In another embodiment of the present invention, said micro-controller means is adapted to control the lamp power by means of sending control signals to said boost pre-regulator means adapted to adjust said high voltage DC bus, and said micro-controller means is adapted to send drive signals to said inverter means to genarate a high frequency FM modulated gating and shaping of said inverter means provided to obtain a stable operation of said high intensity discharge lamp at high frequencies and to eliminate an acoustical resonance. Said micro-controller means further comprises a ballast protection system means adapted to ensure proper operation of all elements and to prevent a damage of said high intensity discharge lamp ballast system, and said micro-controller is adapted to manage said ballast protection system by means of controlling said lamp voltage and said lamp current.

In yet another embodiment of the present invention, said micro-controller is adapted to control the lamp power by means of processing said lamp current and said lamp voltage. Said system further comprises a temperature sensing means adapted to send signals to said micro-controller means, and wherein said micro-controller is adapted to regulate the power supplied to said boost pre-regulator means to avoid overheating of said inverter means, and as a result, overheating of said complete system. Said boost pre-regulator means is further adapted to supply power to all logic and low voltage control circuits of said system.

In still another embodiment, said system further comprises:

an input RFI filter means adapted to filter out a high frequency current components of said boost pre-regulator means and a full-wave rectifier means adapted to convert an input line AC voltage into a pulsating DC voltage, wherein said pulsating DC voltage is provided to be fed into said boost pre-regulator means. Said micro-controller means further comprising an indicating system means adapted to provide visual and aural signals provided to indicate various protection statuses of the complete system, and said micro-controller means is adapted to automatically adjust the power fed through said inverter means to facilitate the constant lamp power. The adjusting of the power fed to said inverter means is provided via a voltage regulator feedback loop of said boost pre-regulator means, and said lamp matching network and filter means is adapted to create a resonance start-up condition necessary to strike an arc of said high intensity discharge lamp, wherein said start-up condition is provided by means of generating a high AC voltage on start up. Said boost pre-regulator means is adapted to generate a ballast current of sine-wave configuration which is in phase with an input voltage of sine-wave configuration, thus allowing to achieve a near unity power factor with a very low total harmonic distortion.

In yet another embodiment, the present invention comprises a micro-controller-operated high intensity discharge lamp ballast method comprising the following steps:

converting a DC voltage into a high voltage DC bus by means of a boost pre-regulator means adapted to facilitate a proper lamp power regulation;

converting said high voltage DC bus by means of an inverter means into a high frequency FM modulated square wave voltage provided to feed a lamp matching network and filter means;

converting said high frequency FM modulated square wave voltage by means of said lamp matching network and filter means into a high frequency FM modulated current facilitating the proper lamp power regulation;

sensing a lamp voltage and a lamp current across said high intensity discharge lamp by means of a lamp current and lamp voltage sensing means adapted to feed said lamp voltage and lamp current into a micro-controller means, wherein said micro-controller means is adapted to facilitate proper functioning of said high intensity discharge lamp ballast system by means of sending a predetermined set of commands adapted to monitor and control all elements of said system.

In still another embodiment of the present invention, said micro-controller means is adapted to control the lamp power by means of sending control signals to said boost pre-regulator means adapted to adjust said high voltage DC bus, and said micro-controller means is adapted to send drive signals to said inverter means to generate a high frequency FM modulated gating and shaping of said inverter means provided to obtain a stable operation of said high intensity discharge lamp and to eliminate an acoustical resonance. Said micro-controller means further comprises a ballast protection system means adapted to ensure proper operation of all elements and to prevent a damage of said high intensity discharge lamp ballast system, and said micro-controller is adapted to manage said ballast protection system by means of controlling said lamp voltage and said lamp current. Said micro-controller is adapted to control the lamp power by means of processing said lamp current and said lamp voltage.

In yet another embodiment, said method further comprises a step of regulating of the power supplied to said boost pre-regulator means by means of a temperature sensing means adapted to send signals to said micro-controller, wherein said micro-controller is adapted to regulate power supplied to said boost pre-regulator means to avoid overheating of said inverter means, and as a result, overheating of the complete and system. Said boost pre-regulator means is further adapted to supply power to all logic and low voltage control circuits of said system. Said method further comprises steps of:

filtering out a high frequency current components of said boost pre-regulator means by means of an input RFI filter means;

converting and input line AC voltage into a pulsating DC voltage by means of a full-wave rectifier means, wherein said pulsating DC voltage is provided to be fed into said boost pre-regulator means.

In still another embodiment, said micro-controller means further comprises an indicating system means adapted to provide visual and aural signals provided to indicate various protection statuses of the complete system, and said micro-controller means is adapted to automatically adjust the power fed through said inverter means to facilitate the constant lamp power. The adjusting of the power fed through said inverter means is provided via a voltage regulator feedback loop of said boost pre-regulator means, and said lamp matching network and filter means is adapted to create a resonance start-up condition necessary to strike an arc of said high intensity discharge lamp, wherein said start-up condition is provided by means of generating a high AC voltage on start up. Said boost pre-regulator means is adapted to generate a ballast current of sine-wave configuration which is in phase with an input voltage of sine-wave configuration, thus allowing to achieve a near unity power factor with a very low total harmonic distortion.

DETAILED DESCRIPTION OF THE PRESENT INVENTION

Figure 1:
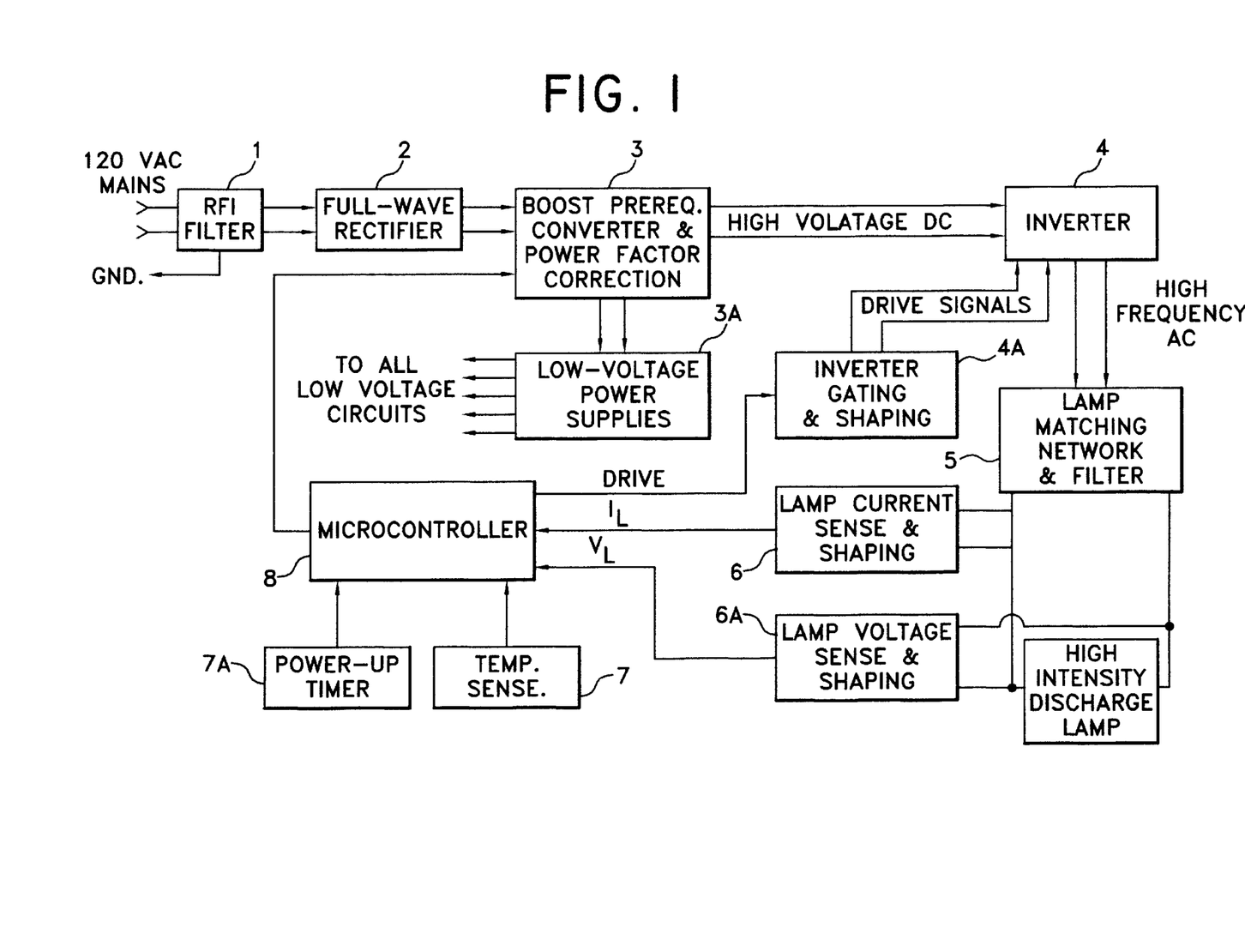
FIG. 1 shows a general block-diagram of a micro-controller-operated high intensity discharge lamp ballast system according to the present invention.
Figure 2A:
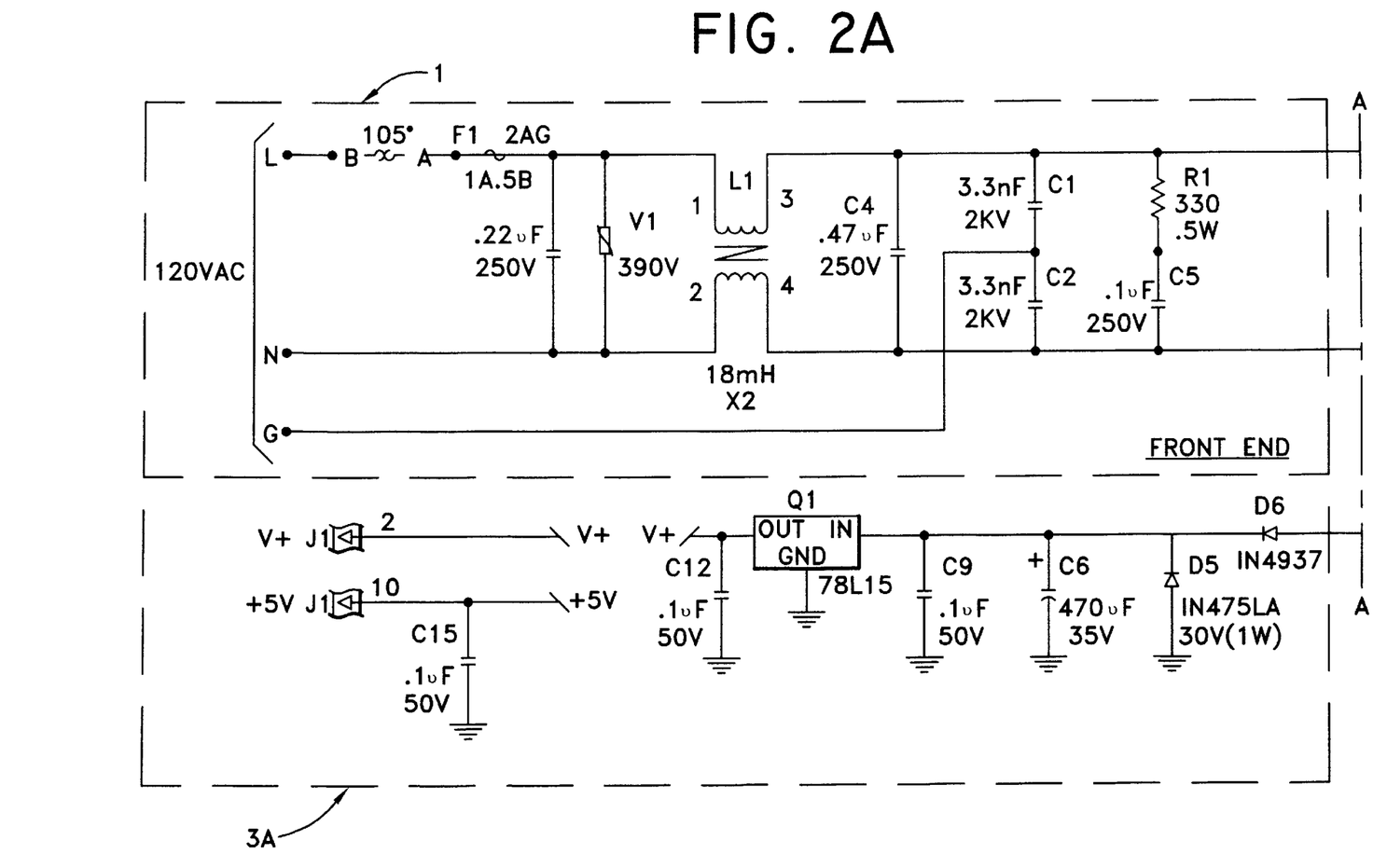
FIGS. 2 and 3 shows a preferred embodiment of the electronic circuitry of the system shown on FIG. 1.
Figure 2B:
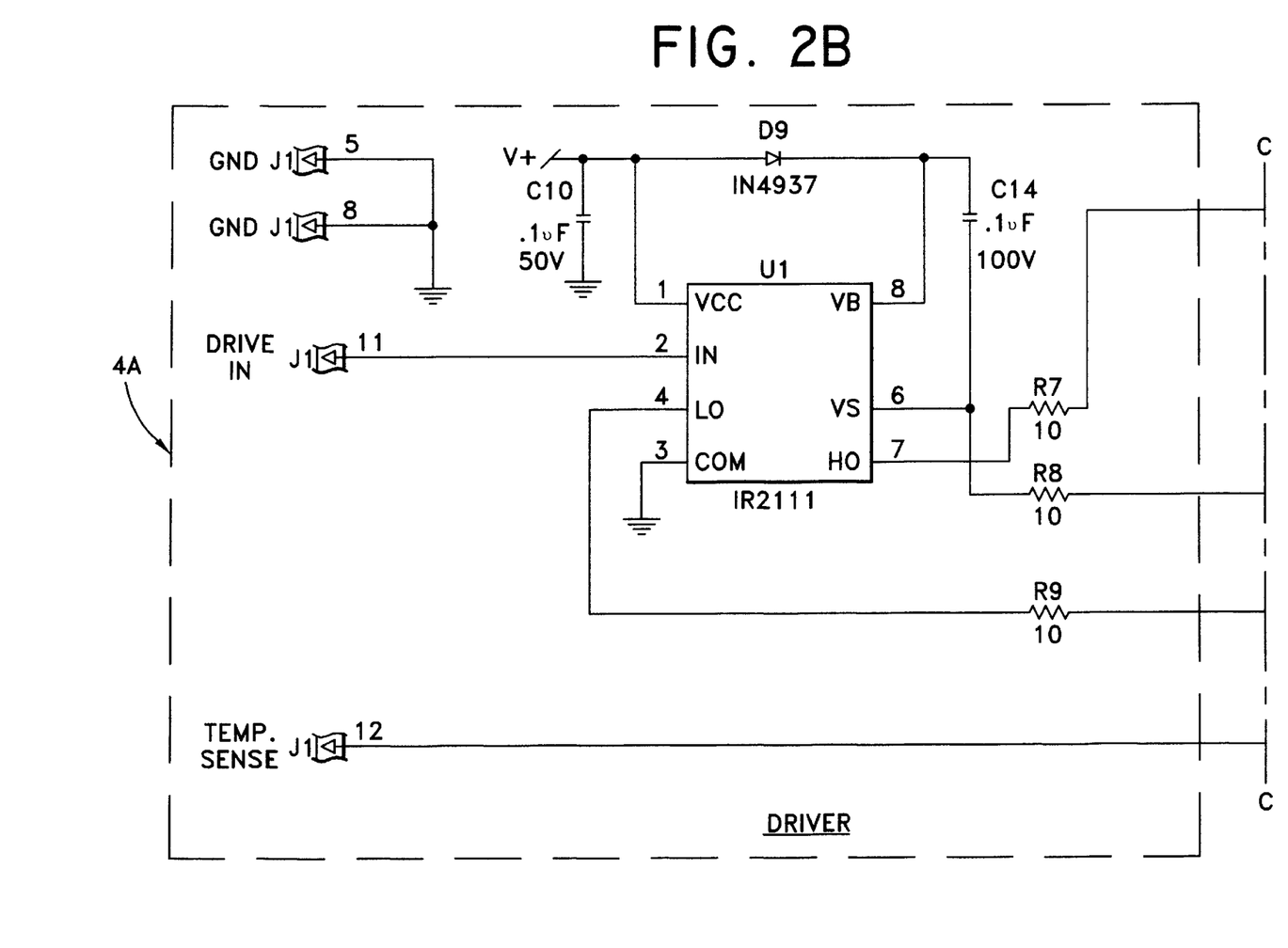
Figure 2C:
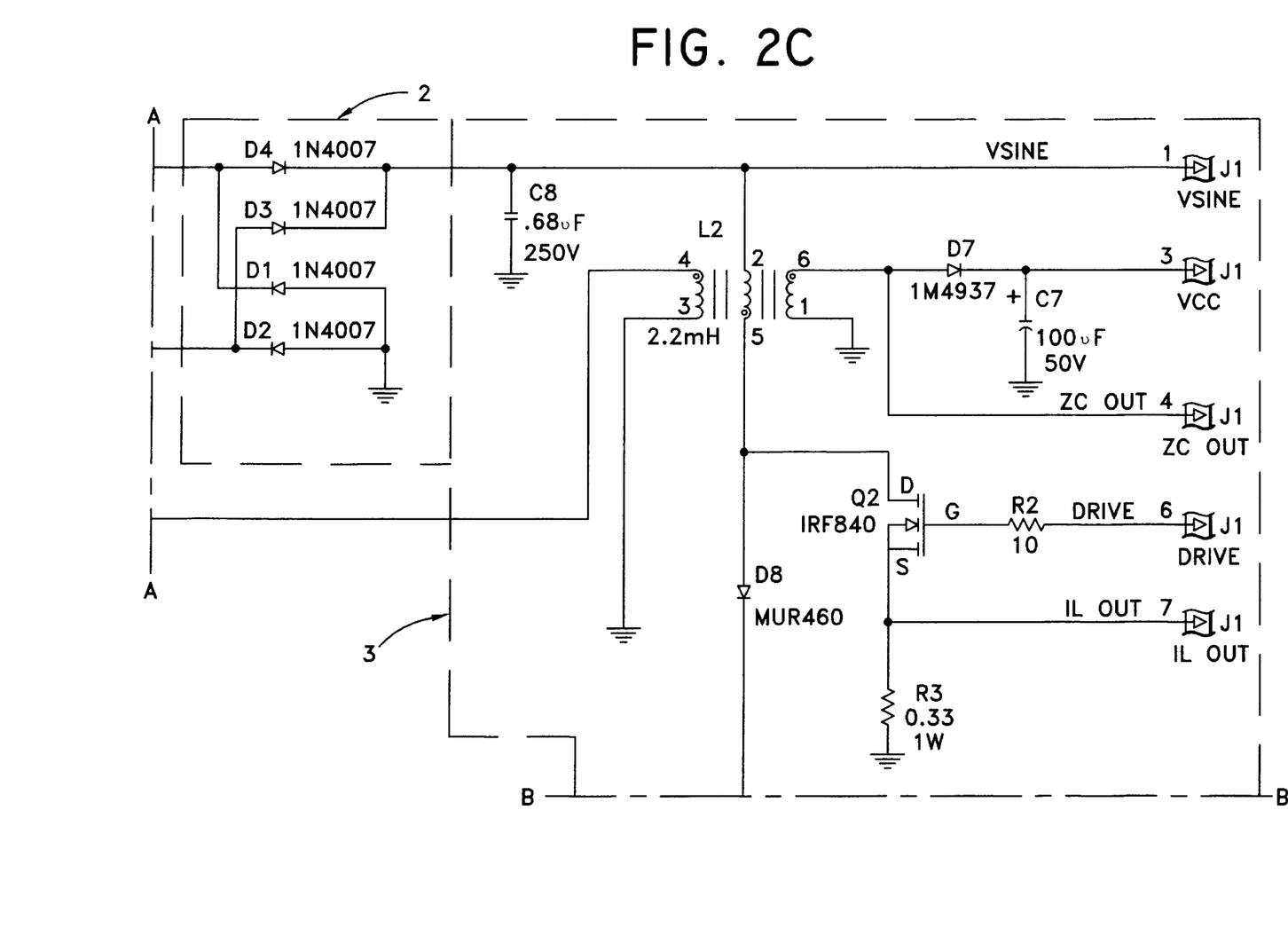
Figure 2D:
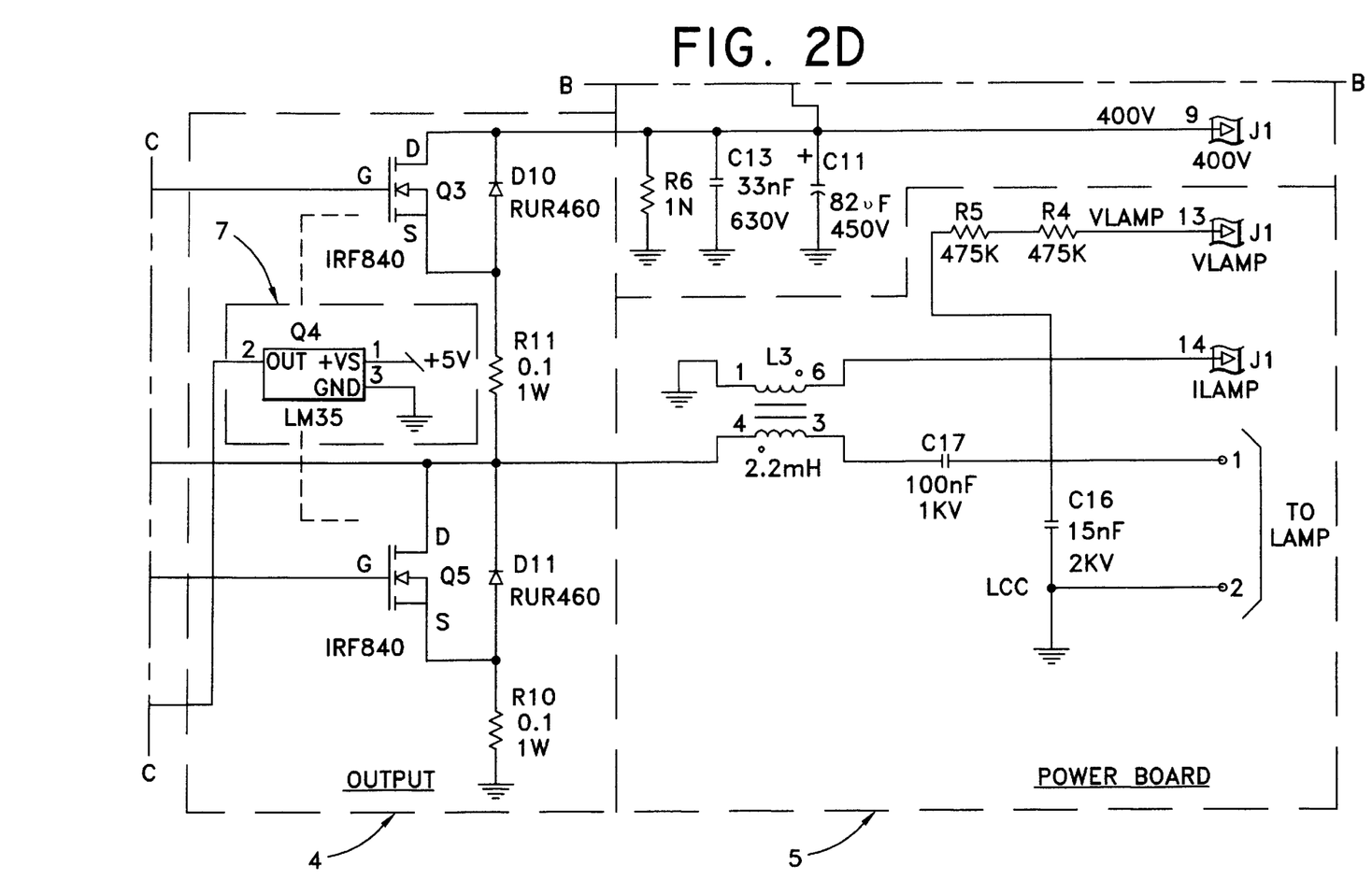
Figure 3A:
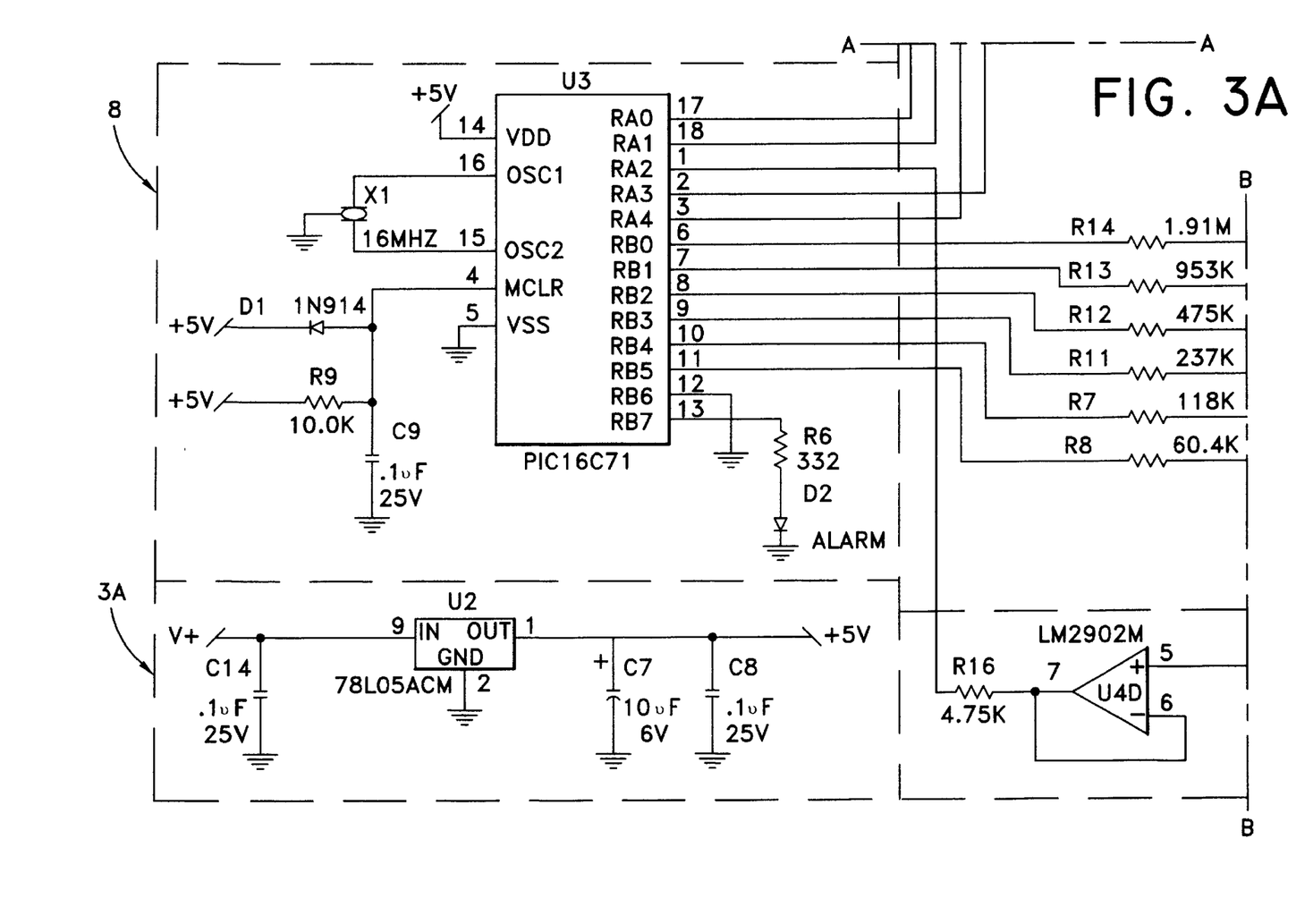
Figure 3B:
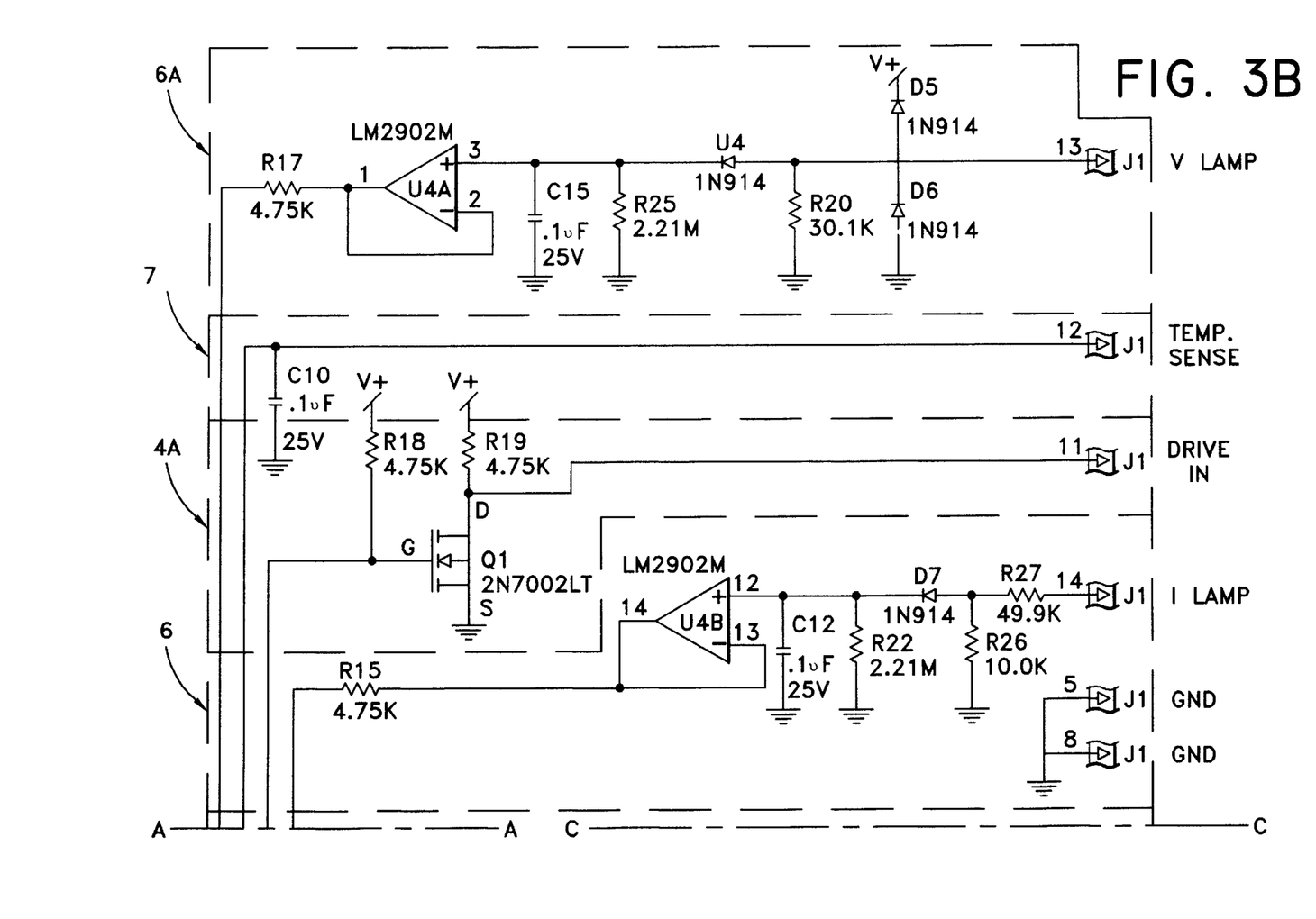
Figure 3C:
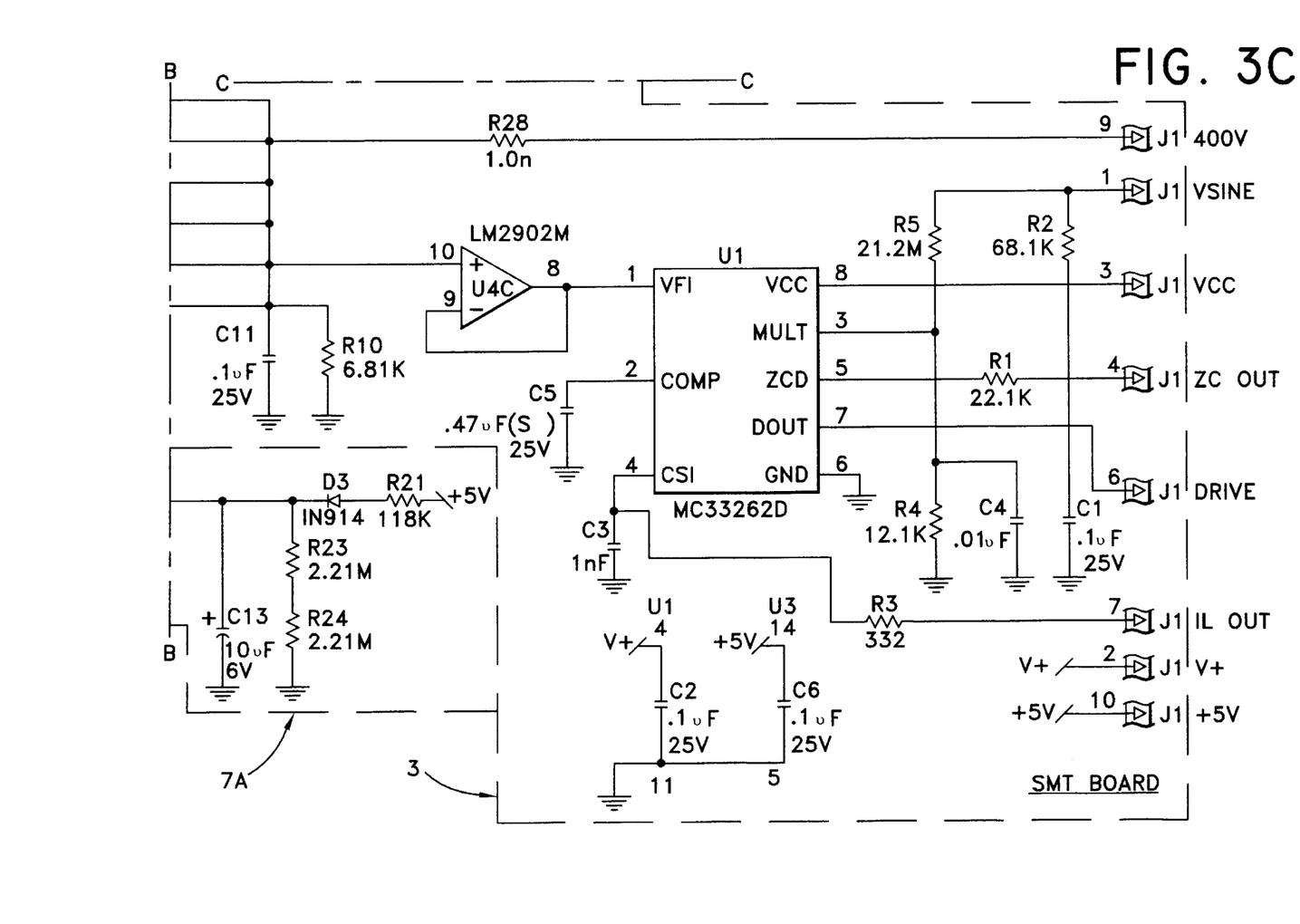

Referring to drawings, FIGS. 1–3 show a micro-controller-operated high intensity discharge lamp ballast system comprising and input RFI filter 1 consisting of capacitors C3, C4, and a differential choke L1 (see FIG. 2) including a low-pass filter to smooth out the fast current pulses drawn by a boost pre-regulator stage. Such an arrangement permits the ballast to draw pure sine-wave current in conjunction with the boost pre-regulator 3. These components of input RFI filter 1 in combination with capacitors C1, C2, C5, and resistor R1 shown on FIG. 2 provide filtering against conductive EMI from the ballast into the 120 volt Mains. Element V1 provides voltage surge suppression to the input of the ballast.

The AC Mains voltage is fed to a full-wave bridge rectifier 2 which produces full-waved rectified pulsating DC voltage. In this case, a capacitor C8 (see FIG. 2) provides some smoothing of this pulsating voltage, especially at high frequencies.

It must be emphasized that the input RFI filter 1 and full-wave rectifier 2 are necessary only in case the power is supplied by AC utility lines. If the ballast is supplied by DC current from a stand-by battery, elements 1 and 2 are not used and may be by-passed.

The ballast system of the present invention further comprises the boost pre-regulator and active power factor correction 3 consisting of elements U1 (see FIG. 3), L2, D8, Q2, C11 (see FIG. 2) and associated components. One of the functions of the boost pre-regulator 3 is to convert the 170 V peak pulsating DC voltage to a regulated 400 V pure DC supply bus. In this case, the output regulation level is adjustable and will be discussed later.

The boost pre-regulator 3 is a variable frequency PWM switching system that switches the inductor current to track the input AC half-wave shape. This provides an average inductor current that is almost a perfect sine-wave after filtering by capacitor C8 of FIG. 2 and the input RFI filter 1. The inductor or ballast current is in phase with the input voltage. As a result, the Mains input "sees" a sine-wave inductor current in phase with sine-wave input voltage which provides to achieve near unity power factor with very low total harmonic distortion. Such an arrangement is a very important feature of the typical boost pre-regulator.

A voltage regulator loop of boost pre-regulator 3 fed through chip U1 (see FIG. 3) through OP-AMP chip U4c of FIG. 3 is controlled by a micro-controller chip U3 (FIG. 3) which is used to automatically adjust the power fed through the inverter stage thus insuring constant lamp power.

Secondary and tertiary winding on boost inductor L2(see FIG. 2) form a current transformer action necessary to supply in conjunction with voltage regulators Q1 and U4 of FIG. 3, current in two voltages (+15V and +5V) to all logic and low-voltage circuits 3A of the ballast system.

Boost pre-regulator allows to achieve a line power factor around 0.99 with total harmonic distortion under 5%, which, in combination with an inverter 4, leads to a very power-efficient ballast. Pre-regulator 3 also permits the ballast to keep the lamp to operate through several cycles of Mains current drop-out, which provides constant lamp power over a very wide range of input line voltages.

As it was previously mentioned, it is possible to operate the boost pre-regulator and active power factor correction 3 (hence, the whole ballast system) with DC current instead of AC line voltage. In this case, elements of blocks 1 and 2 of FIG. 1 can be by-passed with DC fed to the capacitor 8. However, those elements of blocks 1 and 2 may be left in place since the ballast can operate on either AC or DC inputs. DC operation is very useful in case no AC voltage is available, such as in emergency battery operation, aboard a ship, etc.

The high voltage DC is fed to the inverter's 4 stage configured in half-bridge mode. The gate drive shaping and level shifting for the high-side is performed in block 4A by means of chip U1 which also introduces a dead time of 1 uS to prevent cross-conduction of the power output MOSFETS Q3 and Q5 of FIG. 2. The high-side drive is performed by means of a boot-strap action of elements D9, C15 and Q5(see FIG. 2) at every switching period. The drive shaping IC chip U1 shown on FIG. 2 receives its signals from micro-controller U3 (FIG. 3) of block 8. Due to the nature of the half-bridge switching and the output lamp matching LCC filter network 5, the MOSFET output elements are always switched at zero voltage which contribute to low-loss "soft-switching" characteristics of the output stage.

As a result, inverter 4 provides a high frequency FM modulated square-wave driving voltage to feed the lamp matching network 5 comprising elements L3, C16 and C17 shown on FIG. 2. The lamp matching network 5 is provided to match the output on the inverter 4 to the high intensity discharge lamp. The inductor L3 and capacitor C17 (see FIG. 2) are provided to limit current supplied to the lamp at the operating frequency. As a result, lamp matching network and filter 5 converts the high frequency FM modulated square-wave voltage into a high frequency FM modulated current that provides a proper power to the lamp. When there is no load resistance (the lamp is "off"), upon application of a drive voltage to the LCC circuit of block 5, a very high voltage appears across the capacitor C16 of FIG. 2 due to the tuned resonance action of these components. This high voltage is enough to strike an arc in the high intensity discharge tube. Once the arc is struck, the loaded "Q" of the LCC is sufficient to maintain the proper arc current with the appropriate driving voltage. In view of the LCC resonant starting, the arc is struck with a sine-wave voltage which poses much less stress on lamp electrodes and socket assembly as compared to conventional pulse starting. The fact that the lamp is powered by a sine-wave current and voltage which are in phase prolongs the life of the lamp's electrodes; this is also a very important feature of the present invention.

Components U4A with associated passive elements shown on FIG. 3 form a peak detection circuit 6A that senses the voltage across the high intensity discharge arc tube. This voltage is properly scaled, rectified and buffered to be fed into the micro-controller's 8 voltage A/D channel. This DC voltage has a direct relation with arc tube voltage.

Similarly, element U4B with its associated passive components shown on FIG. 3 form a peak-detecting circuit 6 provided to sense the current across the metal halide arc tube. This current sensing circuit 6 is adapted to facilitate scaling, rectifying and peak-detecting of the voltage across current transformer secondary of lamp inductor L3 (see FIG. 2). This DC voltage has a direct relation to the arc tube current that is also fed to the current A/D channel of the micro-controller 8.

Integrated circuit or sensor Q4 shown on FIG. 2 forms an active OP-AMP temperature sensor 7 which produces a DC voltage in proportion to temperature. This DC voltage is fed to the temperature A/D channel of the micro-controller 8. Sensor Q4 is mounted beside the output power MOSFETS Q3 and Q5 (see FIG. 2) of the inverter 4 and is provided to continually monitor temperature of the power MOSFETS since those elements are the most prone to break down due to overheating. If sensor Q4 is not used, a jumper is required between pins 2 and 3 of block 7 of FIG. 2.

Figure 4A:
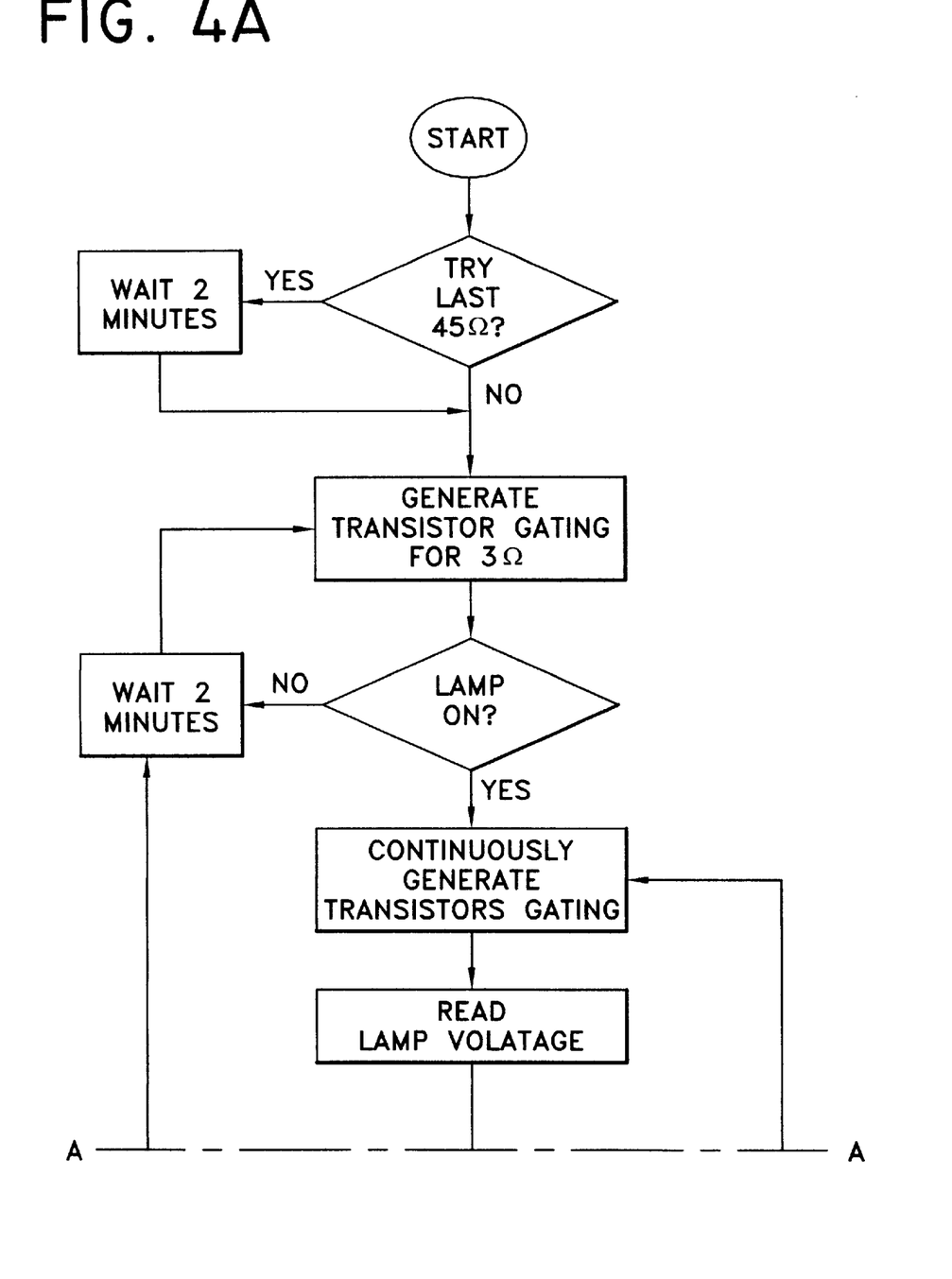
FIG. 4 shows a flow-chart of the micro-controller-operated high intensity discharge lamp ballast method according to the present invention.
Figure 4B:
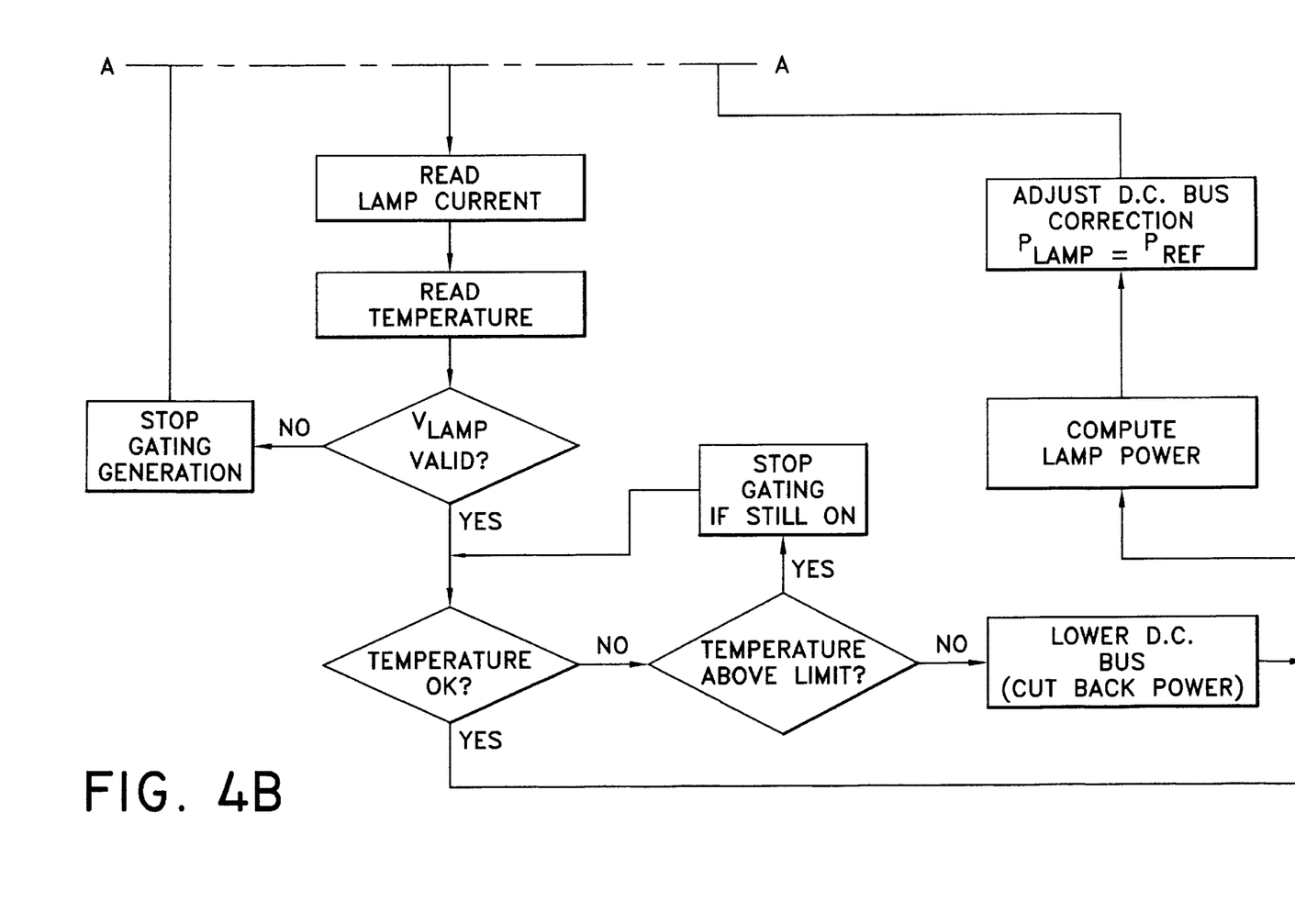

The micro-controller 8 is the most essential element of the present invention and comprises a chip U3 (see FIG. 3) which is adapted to facilitate proper functioning of the complete ballast system by means of sending a predetermined set of commands shown in the flow-chart of FIG. 4.

The micro-controller 8 provides the following functions:

Drive frequency and modulation:

The inverter's 4 driving frequency is synthesised by means of micro-controller 8 through a look-up table program code. This synthesis is altered periodically to provide a sort of digital FM modulation that continuously shifts the drive frequency about a center point. This system is very crucial for obtaining stable operation of the arc lamp at high frequencies and for eliminating the phenomena known as "acoustic resonance" which is common to all high-intensity discharge lamps at high frequencies. The modulation is altered at lamp start-up to provide proper drive frequency to achieve resonance of the output LCC network that provides the high voltage necessary to strike the arc;

Lamp power regulation:

The DC voltage from the lamp current and lamp voltage shaping and buffer circuits 6 and 6A are fed into 8-bit A/D converters in the micro-controller 8. The digital words corresponding to actual lamp current and voltage are processed (multiplied) by software to produce an average lamp power function. This data is then compared to a pre-set value in memory. Since, in the high intensity discharge lamp, the arc voltage is a function of lamp life, any change in arc voltage is reflected back to this pre-calculated lamp power function which also resides in memory. As arc voltage increases, the micro-controller software outputs a 6-bit digital output which switches "in" different resistor values in the boost pre-regulator DC feedback loop. The result is that DC voltage which is fed to the lamp inverter is adjusted to reduce lamp arc current as arc voltage increases in order to obtain constant lamp power. If this is not done, lamp arc power will shoot up and, as a result, will shorten the lamp life and cause colour shift in the arc, which is highly undesirable. Also, on lamp start-up, the DC inverter voltage is adjusted purposely higher to provide a higher arc current which would cause the lamp to run up to its operating point in a shorter length of time. As a conclusion, the micro-controller provides power regulation by means of signals sent to boost pre-regulator through DC feedback loop which adjust voltage fed to inverter. The main purpose of such an arrangement is to obtain constant lamp power.

Protection system:

There are numerous protection sub-routines in the operating software of the present invention which are provided to ensure proper operation of all elements and to prevent damage of the ballast system in the following manner:

If the arc does not strike within a predetermined length of time, the micro-controller will put the ballast into a waiting mode for approximately 2 minutes. If this not done, the output stage inverter would be destroyed. After the waiting period is over the system will try to re-start the lamp. If; after 10 re-start tries the arc is still not "on", the ballast will enter a "sleep" mode, and the system would have to be re-set by cycling the Mains power. This feature also protects the ballast if there is no lamp attached;

In case the ballast lamp leads are shorted together (or if an incandescent lamp is attached), the system will go through the waiting state cycling routine as described above;

The micro-controller software with IC chip U4D and associated components shown on FIG. 3 (Power-up Timer 7A of FIG. 1) (along with an A/D channel) provide a power-on delay which provides a waiting-state of 45 seconds if the ballast Mains voltage is turned off and on more than once. This prevents damage of the ballast in the event that the Mains voltage is cycled off and on for whatever reason.

The temperature sensor voltage is fed into another 8-bit A/D channel in the micro-controller and is loaded into memory which is a function of the actual ballast temperature. The software then compares this data to pre-set values in memory, and if these values are exceeded, the ballast cuts back the DC inverter voltage which would cut back lamp power consequently lowering the temperature of the power components supplying power to the lamp. If a high temperature limit is reached, the micro-controller will shut down the drive to the lamp until the temperature drops back to a pre-set value. This monitoring system allows to protect the lamp, ballast and fixture against excessive temperatures.

4. Indicating system:

The indicating system may comprise visual or aural indicators which show various protection statuses of the complete ballast system, such as:

lamp out-of circuit;
lamp short-circuit;
lamp hot-restrike;
ballast over-temperature;
ballast power-on delay;
lamp arc ignition, etc.

Above are only a few applications illustrating various situations, and these features can by tailored to suit the particular application at hand.

The present micro-controller-operated system has the following advantages if compared to all known systems:

the electronic ballast according to the present invention allows to use a new low-wattage colour-corrected high intensity discharge lamps which are now available on the market. Using a micro-controller regulated system, these lamps would not be subject to undesirable colour-shifting which is inherent to all known high intensity discharge lamps;

the new protection system incorporated into the ballast operating software facilitates a very reliable lamp-ballast combination by means of eliminating all common failure modes that known electronically or magnetically ballasted systems would usually experience;

the new indicating system provides a unique way of interfacing the end-user with the lamp-ballast system making troubleshooting easier, and this system can be tailored for different applications;

most importantly, the micro-controller driven system provides a high intensity discharge lamp ballast which is reliable, versatile, upgradable, compact and cheap, since less parts are used for this new system.

Thus, it can be seen that the objects of the present invention have been satisfied by the structure presented hereinabove. While in accordance with the Patent Statutes, only the best mode and preferred embodiments of the present invention has been presented and described in detail, it is to be understood that the invention is not limited thereto or thereby. Accordingly, for an appreciation of the true scope and breadth of the invention, references should be made to the following claims.

We claim:

1. A micro-controller-operated high intensity discharge lamp ballast system for driving a high intensity discharge lamp, comprising:

a boost pre-regulator arranged to receive a DC voltage signal and a regulation control signal and to provide a high DC voltage signal having a power level controlled by said regulation control signal;

an inverter means connected to the boost pre-regulator means for converting said high DC voltage signal into a high frequency FM modulated square wave voltage signal having a frequency related to a drive frequency signal input;

a lamp matching network and filter arranged to receive the FM modulated square wave voltage signal from the inverter means and to provide a high frequency FM modulated sine-wave current signal for driving said high intensity discharge lamp;

a lamp current and voltage sensing circuit arranged to sense a lamp voltage and a lamp current across said high intensity discharge lamp; and a micro-controller arranged to generate said drive frequency signal in accordance with a predetermined drive frequency synthesis which is periodically altered to provide an FM modulated output signal from the inverter means and which has a drive frequency which is continuously shifted about a center point;

said micro-controller further arranged to receive said sensed lamp current and voltage, to calculate an average lamp power function from the sensed lamp voltage and lamp current, to compare the average lamp power function with a pre-set value to produce a comparison signal, and to produce the regulation control signal as a function of the comparison signal.

2. The micro-controller-operated high intensity discharge lamp ballast system according to claim 1, further comprising:

a temperature sensing means for sensing an operating temperature of the inverter means, said micro-controller arranged to adjust the regulation control signal in response to the temperature sensing means to thereby control the high DC voltage signal produced by the boost pre-regulator.

3. The micro-controller-operated high intensity discharge lamp ballast system according to claim 1, wherein said boost pre-regulator comprises a low-voltage power supply means for producing low voltage power supply signals compatible with logic and low voltage control circuits of said system.

4. The micro-controller-operated high intensity discharge lamp ballast system according to claim 1, further comprising:

an input RFI filter means for filtering out high frequency current components from said boost pre-regulator; and a full-wave rectifier means for converting an input line AC voltage signal into a pulsating DC voltage signal that forms the DC voltage signal processed by said boost pre-regulator.

5. The micro-controller-operated high intensity discharge lamp ballast system according to claim 1, wherein said micro-controller is arranged to automatically adjust the regulation control signal in accordance with said sensed lamp current and voltage so that the high frequency FM modulated current signal provides a substantially constant lamp power.

6. The micro-controller-operated high intensity discharge lamp ballast system according to claim 1, wherein said lamp matching network and filter comprises a resonant circuit to create a resonance start-up condition for arc tube striking, said micro-controller being configured to adjust the drive frequency signal on lamp start-up to cause resonance of the resonant circuit.

7. The micro-controller-operated high intensity discharge lamp ballast system according to claim 1, wherein said boost pre-regulator comprises an inductor and a variable frequency PWM switching means for switching a current in the inductor to produce a sine-wave signal in phase with an input voltage signal.

8. The micro-controller-operated high intensity discharge lamp ballast system according to claim 1, wherein the micro-controller comprises means for successively.

a) verifying whether an attempt to start-up the inverter means has been made during a predetermined elapsed time period and if so, waiting for a first predetermined time period exceeding the predetermined elapsed time period before verifying again;

b) in response to the absence of said attempt, generating the drive frequency signal for a predetermined time period;

c) verifying whether the lamp voltage corresponds to a lamp-on condition;

d) waiting for a second predetermined time period before continuing to generate the drive frequency signal for the time period defined in b) in response to the lamp-on condition not being met;

e) continuously generating the drive frequency signal in response to the lamp-on condition being met;

f) monitoring the lamp voltage and the lamp current and an operation temperature of the inverter means;

g) in response to the lamp voltage being out of a predetermined range, stopping the generation of the drive frequency signal for the time period defined in b) and returning to c);

h) in response to said operation temperature exceeding a predefined limit, performing at least one of temporarily stopping the generation of the drive frequency signal and adjusting the regulation control signal to cause the boost pre-regulator means to reduce the high DC voltage signal; and i) in response to the lamp voltage being within the predetermined range, calculating a current lamp power value and adjusting the regulation control signal to thereby alter the lamp power to correspond to a predetermined lamp power reference value.

9. The micro-controller-operated high intensity discharge lamp ballast system according to claim 1, wherein the inverter means comprises:

a gating and shaping means receiving the drive frequency signal from the micro-controller and producing at least one drive signal in accordance with the drive frequency signal; and switching elements responsive to said at least one drive signal.

10. A method for operating a high intensity discharge lamp ballast for a high intensity discharge lamp, comprising the steps of:

converting a DC voltage signal into a high DC voltage signal in accordance with a regulation control signal;

converting said high DC voltage signal into a high frequency FM modulated square wave voltage signal in accordance with a drive frequency signal by means of an inverter means;

converting said high frequency FM modulated square wave voltage signal into a high frequency FM modulated sine-wave current signal for driving said lamp;

sensing a lamp voltage and a lamp current;

calculating an average lamp power function from the lamp voltage and the lamp current;

comparing the average lamp power function with a pre-set value to produce a comparison signal;

producing the regulation control signal as a function of the comparison signal; and varying the drive frequency signal according to a predetermined drive frequency synthesis which is altered periodically to continuously shift the drive frequency of said square wave voltage signal about a center point.

11. The method according to claim 10, further comprising the steps of:

sensing an operating temperature of the inverter means; and adjusting the regulation control signal in response to said sensed temperature.

12. The method according to claim 10, further comprising the step of:

producing low voltage power supply signals compatible with logic and low voltage control circuits in said ballast.

13. The method according to claim 10, further comprising the steps of:

filtering out high frequency current components from said ballast by means of an input RFI filter means; and rectifying an input line AC voltage signal to produce said DC voltage signal.

14. The method according to claim 10, wherein the regulation control signal is adjusted to provide a substantially constant lamp power.

15. The method according to claim 10, further comprising the steps of:

adjusting the drive frequency signal on lamp start-up to create a resonance start-up condition to strike an arc in said lamp.

16. The method according to claim 10, wherein said step of converting said DC voltage signal into said high DC voltage signal is performed with a boost pre-regulator comprising an inductor and a variable PWM switching circuit, the method further comprising the step of switching a current in the inductor by means of the switching circuit to produce a sine-wave signal in phase with said input DC voltage signal.

17. The method according to claim 10, wherein the micro-controller means successively:

a) verifies whether an attempt to start-up the inverter means has been made during a predetermined elapsed time period and if so, waits for a first predetermined time period exceeding the predetermined elapsed time period before verifying again;

b) in absence of said start-up attempt, generates the drive frequency signal for a predetermined time period;

c) verifies whether the lamp voltage corresponds to a lamp-on condition;

d) waits for a second predetermined time period before continuing to generate the drive frequency signal for the time period defined in b) if said lamp voltage does not correspond to said lamp-on condition;

e) continuously generates the drive frequency signal if the lamp voltage does not correspond to said lamp-on condition;

f) monitors the lamp voltage and the lamp current and an operation temperature of the inverter means;

g) stops generating the drive frequency signal for the time period defined in b) and returns to step c) if the lamp voltage is not within a predetermined range;

h) in response to said operation temperature exceeding a predefined limit, performs at least one of temporarily stopping the generation of the drive frequency signal and adjusting the regulation control signal to reduce the high DC voltage signal; and i) if the lamp voltage is within the predetermined range, calculates a lamp power and adjusts the regulation control signal to thereby alter the lamp power to correspond to a predetermined lamp power reference value.

* * * * *